April 16, 1968   R. G. WOOLWORTH   3,377,736
BOX CONSTRUCTIONS

Filed Sept. 10, 1965   2 Sheets-Sheet 1

United States Patent Office 3,377,736
Patented Apr. 16, 1968

3,377,736
BOX CONSTRUCTIONS
Richard G. Woolworth, Lancaster, Pa., assignor to
Old Pal, Inc., Lititz, Pa.
Filed Sept. 10, 1965, Ser. No. 486,373
9 Claims. (Cl. 43—57.5)

ABSTRACT OF THE DISCLOSURE

A box for tools, fishing tackle and the like including a lower portion and an upper lid portion pivotally connected thereto; at least one tray means is supported by cantilever mechanism and is arranged to be moved into and out of the box on closing and opening of the lid portion; oppositely located cushion material is provided in the box to protect articles disposed therebetween against shock; the tray means is provided with a cover; the interior bottom of the tray and the interior of the cover are also provided with resilient cushion material to support articles therebetween against shock; a rigid member extends inwardly of the box lid and engages and positively retains the tray cover in closed position.

---

This invention relates generally to tool and tackle boxes and more particularly to box constructions applicable to tool and tackle boxes and the like, which box constructions are particularly adapted to hold at least some of the contents firmly but gently in desired positions whereby the contents remain segregated from one another and safe from impact damage during rough handling and even overturning of the box.

Tool and tackle boxes of different sizes and constructions are well known. These boxes generally have one or more trays which can be cantilevered. The trays are generally compartmented or divided by dividers for receiving therein small parts, such as screws, nuts in tool boxes and lures, files and very small hooks etc. in tackle boxes. When these boxes are carefully carried in upright position, the contents thereof remain in place and properly segregated from one another and the contents are not damaged. However, should the box be dropped, overturned or generally roughly handled, the contents thereof are likely to be displaced from their proper position and even damaged.

It is a principal object of the present invention to provide box constructions usable for tool boxes and tackle boxes and the like in which the box is provided with resilient cushions which act when the box is closed to hold all or selected contents of the box in place and to protect these contents from impact damage should the box be dropped or handled roughly.

A feature of the box constructions of the present invention is the provision of resilient readily conformable material, such as a foamed plastic or a felt, or the like, on surfaces of the box, which surfaces come into mutually facing relation when the box is closed and between which surfaces when the box is closed an article or articles to be carried in the box are held in place.

In accordance with a specific embodiment of the invention, the uppermost tray of the box is provided with a lid and the inside of the lid and at least part of the inside bottom of the tray are provided with resilient readily conformable material so that when the lid is closed on the tray two resilient conformable surfaces are defined between which the contents of the box may gently but firmly be held. In accordance with a still more specific embodiment of the invention, the cover of the box may be provided with a configuration which extends into the box when the cover is closed and abuts the tray lid whereby the tray lid is held in closed position by the abutting configuration of the box cover. Thus if the box cover is locked, even should the box be overturned, the lid of the tray will not open because of the abutting configuration of the box cover.

In accordance with another specific embodiment of the present invention, the exterior of the bottom of the lowermost tray is provided with a shaped piece of resilient conformable material and the interior bottom surface of the box is provided with a piece of resilient conformable material which is shaped to cooperate with the first mentioned piece. The two pieces of resilient conformable material are so located so that as the box is closed the piece on the exterior of the bottom of the lowermost tray moves into opposing position with respect to the other piece whereby there is defined between said pieces a space in which an object to be carried in the box may be placed which object is gently but firmly clamped between said pieces when the box is closed. Accordingly, the object is segregated from other objects in the box and remains segregated and is protected from shock should the box be roughly handled.

Other objects of the present invention will become apparent and yet more specific embodiments thereof will be described in the following detailed portions of the specification and in the claims appended thereto, in conjunction with the drawings in which:

While the invention will be illustrated and described as applied to a tackle box, it will be understood that the invention is equally applicable to tool boxes and the like of various sizes and can be made of different suitable materials.

Figure 1:
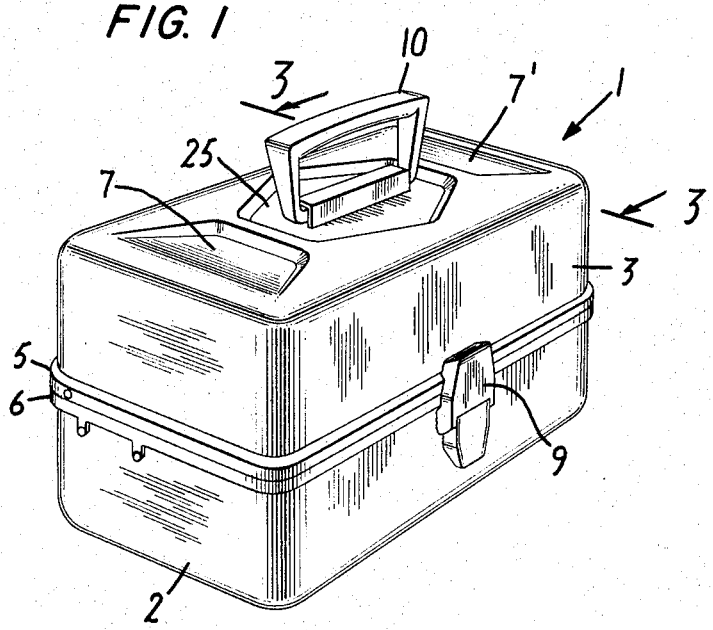
FIG. 1 is a perspective view of a box according to the invention illustrated in a closed condition.

According to FIG. 1, the invention comprises a tackle box 1 comprising means defining a bottom half 2 on which is pivotally mounted a lid 3 for opening and closing the bottom half and jointly therewith defining the box. Hinge means 4 (see FIG. 3) are provided on the box pivotally connecting the lid 3 to the bottom half 2. The hinge is preferably constructed so that the lid is a full-opening lid which permits the box to sit solid when open. The box parts heretofore described may be made of any suitable material, for example a tough, high impact polystyrene or other suitable plastic which will not chip, dent, crack or corrode and may be ornamentally colored. Those skilled in the art understand that the bottom 2 of the box is described as a bottom half but this is not restricted to mean that the lid and the lower part 2 are of equal height. The upper and lower parts need not be true halves and the term bottom half encompasses all possible relative dimensions between the parts 2 and 3.

The bottom half and lid 3 are preferably provided with watertight edge constructions along the individual cooperating edges 5, 6. The box is provided with a spill-proof lock or safety latch assembly 9, for example according to United States Patent 3,134,617, by which the box can be locked in a closed condition. The lid is provided with a handle 10 for transporting the tackle box and operating the lid 3 to an open and closed condition. In the lid are defined three indentation 7, 7' and 25 (handle 10 being mounted in the last mentioned of these).

Figure 2:
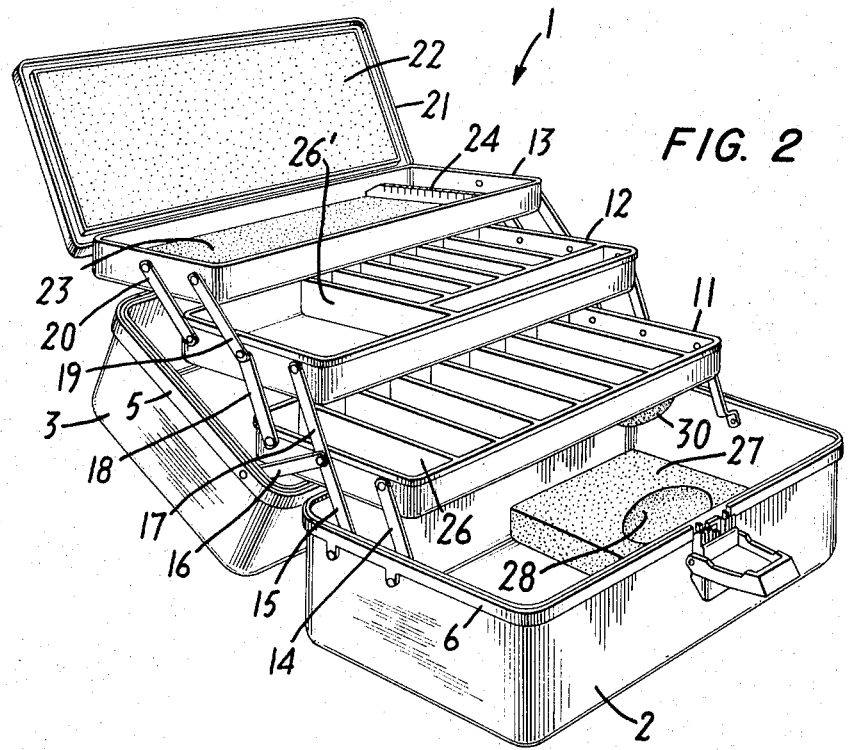
FIG. 2 is a perspective view of the box in FIG. 1 in an open condition.

As shown in FIG. 2, box bottom 2 is a large open utility tray when the box is in an open condition and the lid 3 may be provided with any suitable number of retaining wells providing a convenient place to store hooks, weights, flies, bobbins, shot, etc. without fear of loss while changing lures and the like. The box is provided with a plurality of cantilevered trays comprising a lower tray 11 pivotally mounted on the bottom half with cantilevers on both ends thereof, for example cantilevers 14, 15 and cantilevered to the lid with cantilevers, for example a cantilever 16. Upper trays 12, 13 are mounted on the lowermost tray 11 with pairs of cantilevers 17, 18, 19 and 20. Tray 13 is provided with lid 21 which is pivotally mounted on tray 13 by hinge means 31, lid 21 thus being adapted to open or close on tray 13. Tray 13 at its bottom is provided with a flat piece of resilient foam 23 which is attached to tray 13 by means of an adhesive and which extends the entire width of tray 13 and the length except for that portion after slotted holder means 24. Slotted holder means 24 partitions the bottom of tray 13 into a resilient foam lined portion to its left as viewed in FIG. 2 and an unlined portion to its right as viewed in FIG. 2. The slots in slotted holder means 24 are vertical and are each of a width which permits insertion therein of the leader portion of a lure. Thus, the hook and fly end of lures are laid in the foam lined portion of tray 13 with the leader portions of the lures extended along the length of the tray and inserted in the slots of slotted holder means 24. Lid 21 is essentially entirely lined with a flat piece of resilient foam 22 with merely a peripheral unlined portion where lid 21 contacts tray 13 when closed thereon. When lid 21 is closed on tray 13, foam 22 abuts against the top of slotted holder means 24 and a narrow space is defined between foam 22 and foam 23; thus, the open end of the slots in slotted holder means 24 is closed and the narrow space between foam 22 and foam 23 gently clamps in place the hook and fly portions of the lures. It will, therefore, be appreciated that this arrangement keeps the lures safe and neatly segregated from one another, even when one rather roughly handles the tackle box.

Figure 3:
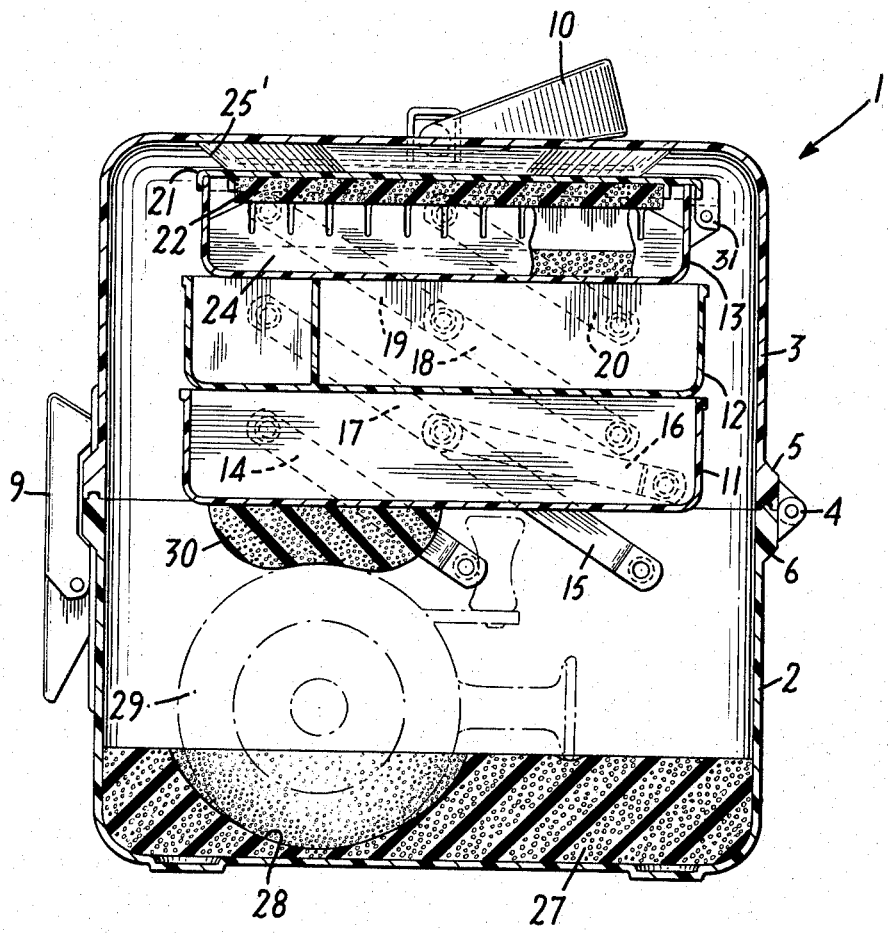
FIG. 3 is an end view, partly in section, of the box in FIG. 1 and containing a reel for a fishing rod.

Bottom half 2 has adhered to its bottom a piece of resilient foam 27 having defined in its top surface an indentation 28 suitable in size and shape to accommodate a portion of a reel (as illustrated in FIG. 3). Adhered to the underside of tray 11 is a piece of resilient foam 30 positioned so that it is vertically above indentation 28 in foam piece 27 when the box is closed and of a size and shape suitable to press against the top portion of a reel (as shown in FIG. 3).

In FIG. 3, the tackle box is shown closed and carrying a reel 29 for a fishing rod. It is seen that the projecting configuration 25' formed by the underside of indentation 25 is flush with the top of lid 21 and thus holds lid 21 in closed position; thus with lock 9 secured, even if the tackle box is turned upside down lid 21 will not open and the contents of tray 13 will remain held in place. Indentations 7 and 7' define similar projecting configurations (not shown) at their undersides, which projecting configurations function in the same manner as projecting configuration 25'. Reel 29 rests in indentation 28 of foam piece 27 and is gently but firmly clamped between said indentation and foam piece 30, the surface of foam piece 30 which contacts reel 29 conforming, due to its resiliency, to the peripheral shape of reel 29.

It will be understood that the box is provided with cantilevers which are mounted on both ends of the trays as illustrated in FIG. 2 and seen on one end when the box is closed in FIG. 3. The cantilevers are made of a suitable material of sufficient strength to support the trays in an open position to which they are actuated automatically by the lid 3 when opened to an open position and securely mounted and held within the box and actuated to a position in which they are housed within the box when the lid 3 is closed. The cantilevers are preferably made of a material that will not corrode or are protected or coated against environmental conditions encountered in use.

Trays 11 and 12 are preferably compartmented as shown in FIG. 2, for example with a plurality of dividers 26, 26' spaced along the length of the trays to define therein selected different sizes of compartments for receiving other flies, hooks, lures, shot, etc. The individual trays extend the full length of the bottom half.

Moreover, the box can be constructed with a single cantilevered tray comparable to the tray 11 or can be constructed with even a larger number of trays than three in a construction similar to that illustrated in the drawing.

While a preferred embodiment of the invention has been shown and described, it will be understood that many modifications and changes may be made within the true spirit and scope of the invention.

What I claim and desire to secure by Letters Patent is:

1. A box comprising means defining a lower half of the box; a cover mounted for opening and closing said lower half and thereby jointly therewith defining the box; at least one tray in said box; resilient contoured conformable cushion means carried on at least two surfaces at the interior of the box, at least one of said surfaces carrying said cushion means being the exterior surface of the bottom of a tray; the cushion means on the bottom of said tray is located opposite a second resilient conformable cushion means when the box is closed; and defined between said opposite cushion means, when the box is closed, is a space adapted to accommodate an object of contents of the box with said cushion means abutting against said object of contents and conforming somewhat to the shape thereof so that the object of contents is firmly but gently gripped and held in place and protected against shock by said cushion means; means cantilevering said tray for automatically moving the cantilevered tray to a position in which said cantilevered tray is housed in the box when the cover of the box is closed from an open position; a cover for said tray; resilient conformable cushion means carried at the interior of the bottom of the tray; resilient conformable cushion means carried at the interior surface of the top of the tray cover opposite said resilient conformable cushion means carried at the interior of the bottom of the tray and defining therewith, when the tray is closed by the cover, a space adapted to accommodate an object of contents in the tray so that the object of contents is firmly but gently gripped and held in place and protected against shock by said cushion means; and means extending from the interior surface of said box cover into engagement with the outer surface of said tray cover to positively retain said tray cover in closed position when said box cover has been moved to its closed position.

2. A box according to claim 1, wherein the opposite resilient conformable cushion means is mounted on the interior surface of the bottom of the box.

3. A box according to claim 2, wherein the resilient conformable cushion means carried at the interior surface of the bottom of the box defines at its upper surface a permanent indentation, that portion of said cushion means upper surface defining the indentation being adapted to abut against said object of contents and the configuration of said indentation approximately matching the peripheral configuration of said object of contents.

4. A box according to claim 3, wherein the indentation approximately matches the peripheral configuration of a reel for a fishing rod, said reel being said object of contents adapted to be accommodated.

5. A box comprising means defining a lower half of the box; a cover mounted for opening and closing said lower half of said box and thereby jointly therewith defining the box; a plurality of cantilevered trays in said box; means cantilevering said trays for automatically moving the cantilevered trays to a position in which said cantilevered trays are housed in the box when the cover of the box is closed from an open position; a first contoured resilient conformable cushion means carried on the exterior surface of a tray; a second contoured resilient conformable cushion means located opposite said first resilient cushion means and defining therebetween a space adapted to accommodate an object of contents of the box; a cover for at least one of said trays; resilient conformable cushion means carried at the interior of the bottom of said one tray; resilient conformable cushion means carried at the interior surface of the top of said one tray cover opposite said resilient conformable cushion means carried at the interior of the bottom of said one tray and defining therewith, when said one tray is closed by the cover, a space adapted to accommodate an object of contents in said one tray so that the object of contents is firmly but gently gripped and held in place and protected against shock by said cushion means; and means extending from the interior surface of said box cover into engagement with the outer surface of said one tray cover to positively retain said one tray cover in closed position when said box cover has been moved to its closed position.

6. A box according to claim 5, wherein mounted in said one tray are holding means defining a series of slots each adapted to hold the lead line of a fishing lure and the bodies of said fishing lure are, collectively, the object of contents adapted to be accommodated.

7. A box according to claim 6, wherein the top of each of said slots is open and the resilient conformable cushion means at the interior of the top of the tray cover is adapted when the tray is closed therewith to abut against the top of the slots.

8. A box according to claim 5, wherein the opposite resilient conformable cushion means is mounted on the interior surface of the bottom of the box.

9. A box according to claim 8, wherein the resilient conformable cushion means carried at the interior surface of the bottom of the box defines at its upper surface a permanent indentation, that portion of said cushion means upper surface defining the indentation being adapted to abut against said object of contents and the configuration of said indentation approximately matching the peripheral configuration of said object of contents.

References Cited

UNITED STATES PATENTS

| | | | |
|---|---|---|---|
| 2,131,408 | 9/1938 | Murrer | 220—22 |
| 2,629,964 | 3/1953 | Thunell | 43—57.5 |
| 2,641,520 | 6/1953 | Moore | 312—291 |
| 2,695,112 | 11/1954 | Bonnevay | 217—7 |
| 3,016,129 | 1/1962 | King | 206—4 |
| 3,223,232 | 12/1965 | Coen | 206—65 |

HUGH R. CHAMBLEE, *Primary Examiner.*

SAMUEL KOREN, *Examiner.*